Oct. 24, 1944.  J. JANDASEK  2,361,104
TRANSMISSION
Filed June 16, 1941
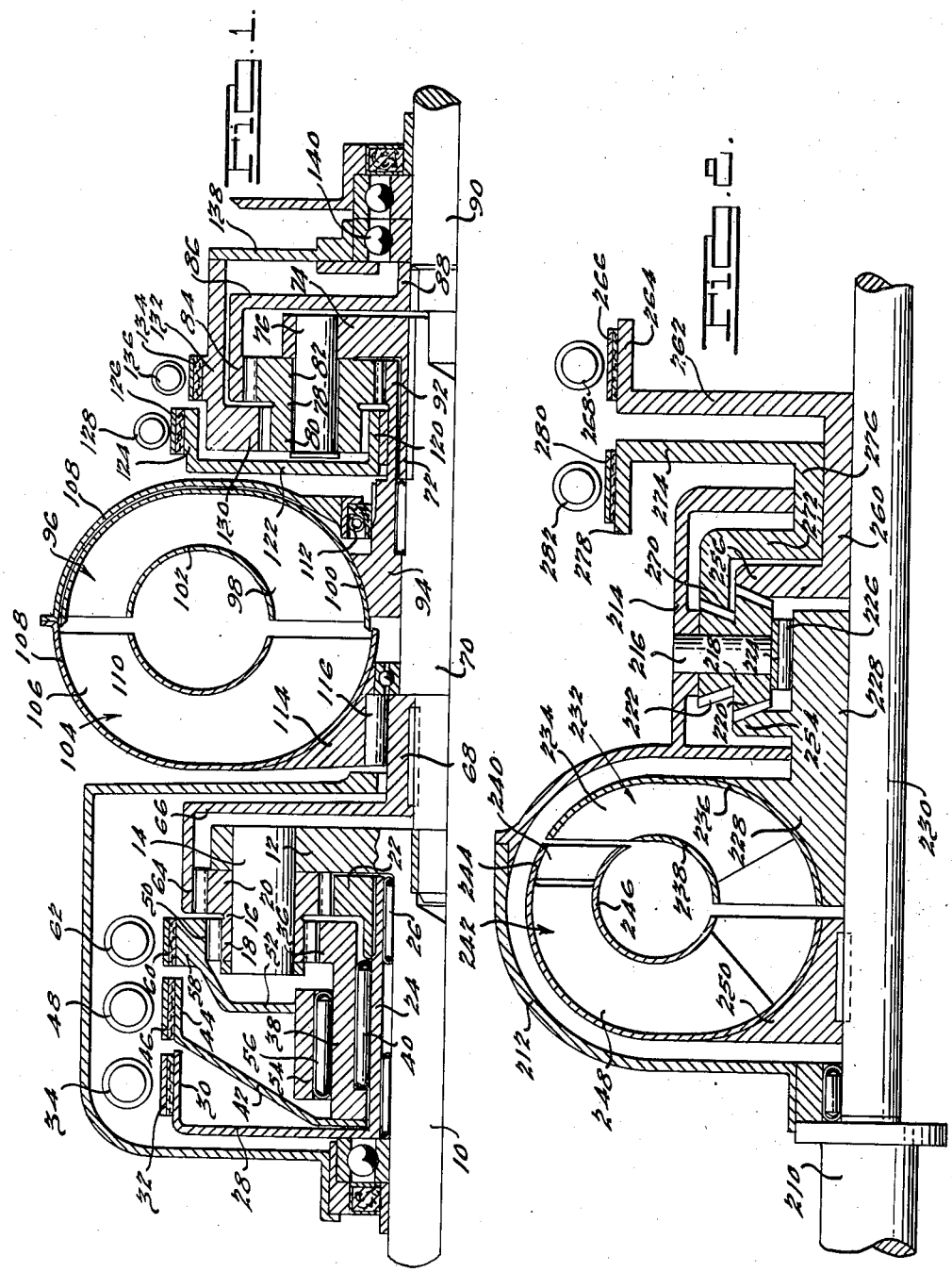
INVENTOR.
Joseph Jandasek
BY
Gray & Smith.

Patented Oct. 24, 1944

2,361,104

UNITED STATES PATENT OFFICE 2,361,104

TRANSMISSION

Joseph Jandasek, Detroit, Mich., assignor to Bendix Aviation Corporation, South Bend, Ind., a corporation of Delaware Application June 16, 1941, Serial No. 398,213

14 Claims. (Cl. 74—189.5)

This invention relates to transmissions and more particularly to combined mechanical and fluid power transmitting means whereby greater efficiency may be attained in the transmission of power from a driving member to a driven member.

An object of this invention is to provide a regenerative fluid power transmitting mechanism associated with mechanical gearing in such a manner that greater flexibility of control is attained.

Another object of the invention resides in the provision of a relatively small power transmitting mechanism capable of transmitting large quanties of power more efficiently than could be transmitted by the provision of a strictly mechanical or fluid transmission.

A still further object is to provide a regenerative fluid power transmitting mechanism interposed between an epicyclic gear train and a mechanical gear transmission to regenerate a progressively varying portion of the power and deliver it to the driving member.

Still a further object of the invention resides in the provision of manually operable means to control the speed ratio of a driving member operably connected to an impeller of a fluid power transmitting device whereby the speed of rotation of the impeller may be varied at will and wherein manually operable means are provided to selectively control the speed and direction of rotation of a driven shaft.

Another object is to provide a fluid power transmitting mechanism interposed between a manually controlled epicyclic gear train and a mechanically controlled gear transmission whereby a varying proportion of power may be regenerated through the fluid transmission and the direction of rotation of a driven shaft may be readily controlled both as to direction and speed of rotation.

Still a further object is to provide a power transmitting mechanism wherein a fluid transmission is interposed between a epicyclic gear train and a driven shaft to transmit varying degrees of power from the epicyclic gear train to the driven shaft at varying speeds.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a device embodying the present invention.

Fig. 2 is a longitudinal sectional view of a modified form of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, it will be observed that a driving shaft 10 is preferably provided with a flange 12 having a plurality of spaced stub shafts 14. The stub shafts 14 carry pinions 16 having spaced pinion gears 18 and 20 of different diameters.

The pinion gear 20 meshes with a sun gear 22 fixed to a sleeve 24 mounted on the driving shaft 10 on suitable bearings 26. The sleeve 24 is provided with a flange 28 having a drum 30 adapted to be engaged by a brake band 32 actuated by a suitable hydraulic unit 34.

The pinion gears 18 mesh with a sun gear 36 carried by a sleeve 38 mounted for rotation on the sleeve 24 on suitable bearings 40. The sleeve 38 is provided with a flange 42 having a drum 44 adapted to be engaged by the brake band 46 actuated by a suitable hydraulic unit 48.

The pinion gears 18 mesh with a ring gear 50 carried by a flange 52 on a sleeve 54 concentrically mounted for rotation on the sleeve 38 by suitable bearing means 56. The ring gear 50 is provided with a drum 58 adapted to be engaged by a brake band 60 preferably actuated by a hydraulic unit 62.

The pinion gears 20 mesh with a ring gear 64 carried by a flange 66 supported by a hub 68 fixed to an intermediate shaft 70.

The intermediate shaft 70 is provided with a hub 72 splined or otherwise suitably secured thereto. The hub 72 is formed with a radially extending flange 74 having a plurality of spaced stub shafts 76. The stub shafts 76 are provided with pinions 78 having spaced pinion gears 80 and 82 respectively of different diameters.

The pinions 82 mesh with a ring gear 84 carried by a flange 86 having a hub 88 suitably secured to a driven shaft 90 by means of splines, keys or other suitable fastening means.

The pinion gears 82 mesh with a sun gear 92 carried by a hub 94 mounted for rotation on the intermediate shaft 70. The hub 94 carries an impeller 96 of a regenerative unit. Fluid energizing vanes 98 may be interposed between a turbine web 100 fixed to the hub 94 and an impeller shroud 102, and serve to impart energy to a fluid circulating within the unit.

A turbine 104 preferably aligned with the impeller 96 is provided with suitable turbine vanes 106 interposed between a turbine web 108 and a turbine shroud 110. As illustrated, the turbine web 108 overlays the impeller web 100 and is provided with a suitable oil seal 112 interposed between it and the hub 94. The turbine web 108 is fixed to a turbine hub 114 mounted on the hub 68 by one-way driving means 116.

The pinion gears 80 mesh with a sun gear 120 carried by a radially extended flange 122 supporting a drum 124 adapted to be engaged by a brake band 126 actuated by a suitable hydraulic unit 128.

The pinion gears 80 mesh with a ring gear 130 on a drum 132 adapted to be engaged by a brake band 134 actuated by a suitable hydraulic unit 136. The drum 132 is provided with a radially extended flange 138 mounted on the driven shaft 90 with suitable bearings 140 interposed.

The operation of this device is as follows: When it is desired that no power be transmitted through the device, the hydraulic units 34, 48 and 62 of the epicyclic gear train are not actuated whereupon the prime mover may rotate the driving shaft 10 freely because the pinion gears 20 carried by the stub shafts 14 mounted on the flange 12 rotate freely within the ring gear 64 and no power is transmitted. When it is desired to transmit power at the low range of speed the hydraulic unit 34 is actuated whereupon the brake band 32 engages the drum 30 to lock the sun gear 22 against rotation. The pinion gears 20 then revolve around the sun gear 22 and drive the ring gear 64 in the forward direction. Rotation of the ring gear 64 results in rotation of the hub 68 to drive the intermediate shaft 70.

Rotation of the intermediate shaft 70 is transmitted through the hub 72, flange 74 and stub shafts 76 to revolve said stub shafts 76 and the pinion gears 82. The pinion gears 82 meshing with the ring gear 84 results in the transmission of a portion of the applied power through the flange 86 and hub 88 to the driven shaft 90. The remainder of the applied power is transmitted through the pinion gears 82, sun gear 92, hub 94 to rotate the impeller 96 of the turbo unit. Upon rotation of the impeller 96 fluid is energized by the impeller blades 98 and is directed to impinge against the turbine vanes 106 of the turbine unit 104. The energy absorbed by the turbine is transmitted through the turbine hub 114 and one-way driving means 116 the intermediate driving shaft 70 to drive it in the forward direction.

When the driven shaft 90 is subjected to high loads a larger proportion of the power applied through the intermediate shaft 70 is regenerated through the fluid transmission to be exerted back on the intermediate shaft 70, and a relatively small proportion of the applied power is transmitted through the ring gear 84, flange 86 and hub 88 to drive the driven shaft 90. As the load to which the driven shaft 90 is subjected is decreased in proportion to the power applied to the intermediate driving shaft 70, a decreasing proportion of the applied power is regenerated through the fluid transmission and an increasing proportion of power is transmitted through the gearing to the driven shaft 90.

When the speed of the driven shaft 90 approaches the speed of the driving shaft and it is desired to vary the power transmitting ratio of the device, the hydraulic unit 48 may be actuated whereupon the brake band 46 engages the drum 44 to lock the sleeve 38 and sun gear 36 against rotation. The pinion gears 18 then rotate around the sun gear 36 and transmit power through the pinion gears 20 to the ring gear 64 to drive the hub 68 and the intermediate shaft 70 at higher speed.

Power thus applied to the intermediate shaft 70 at higher speed is divided between the sun gear 92 and the ring gear 84 to drive the fluid transmission or the driven shaft 90 in proportion to the variations of speed between the intermediate and driven shafts 70 and 90 respectively. As the speed of the driven shaft approaches the speed of the intermediate shaft a greater proportion of the applied power will be exerted on the driven shaft and a progressively decreasing proportion of the applied power will be regenerated through the fluid transmission.

When it is desired to actuate the driven shaft at still higher speed the hydraulic unit 128 is actuated whereupon the brake band 126 engages the drum 124 to lock the sun gear 120 against rotation. The pinion gears 80 then revolve around the sun gear 120 and due to the variation in diameter of the pinion gears 80 and 82 power is transmitted to the ring gear 84 to drive the driven shaft 90 through the flange 86 at higher speed.

When the device is operating in this manner the fluid transmission is virtually inoperative because the only force exerted to drive the impeller is a force caused by the rotation of the sun gear 92 due to the variation of the diameters of the pinion gears 80 and 82. In view of the fact that this difference in diameters is relatively small the speed of rotation of the impeller is slow.

The chief advantage of this rotation of the impeller is that the fluid is kept in circulation whereupon heat may be readily dissipated from the liquid and when it is desired to again employ the fluid transmission, the fluid and the impeller and turbine members are rotating slowly whereupon less force is required to bring them up to speed. One-way driving means 116 interposed between the turbine hub 114 and the hub 68 fixed to the intermediate shaft 70 permits the turbine 104 to rotate freely. During this phase of the operation virtually all of the power applied to the intermediate shaft 70 is transmitted through the ring gear 84 to the driven shaft 90.

When it is desired to operate the device to transmit power in reverse direction the hydraulic unit 136 may be actuated whereupon the brake band 134 engages and locks the drum 132 to hold the ring gear 130 against rotation. The pinion gears 80 roll around within the ring gear 130 and due to the variation in diameters between the pinion gears 80 and 82 the ring gear 84 is driven in reverse direction. Rotation of the ring gear 84 is transmitted through the flange 86 and hub 88 to rotate the driven shaft 90 in reverse direction.

If desired, a reverse drive may also be procured by actuating the hydraulic unit 62 to urge the brake band 60 into engagement with the drum 58 to lock the ring gear 50 against rotation. The ring gears 18 then roll around within the ring gear 50 and due to the variation of diameters of the pinion gears 18 and 20 power is transmitted through the pinion gears 20 to rotate the ring gear 64 in the reverse direction. Rotation of the ring gear 64 is transmitted through the flange 66 and hub 68 to rotate the intermediate shaft 70 in reverse direction. Reverse rotation of the intermediate shaft 70 is transmitted through the flange 74, stub shafts 76, pinion gears 82, ring gear 84, flange 86 and hub 88 to rotate the driven shaft 90 in reverse direction. When the device is operating in this manner the sun gear 92 rotates very slowly due to the variation of diameters of the pinion gears 80 and 82 whereupon there is virtually no regeneration of power through the fluid transmission. However, it does rotate slowly.

When it is desired to effect an emergency low speed both reverse units may be applied by actuating the hydraulic units 62 and 136 to lock the ring gears 58 and 130 respectively whereupon due to the variation of diameters of the pinion gears 18 and 20 and the pinion gears 80 and 82, the driven shaft 90 will be rotated at slow speed but with high torque multiplication. When the device is thus operating the regenerative fluid transmission rotates slowly but does not function to transmit any material power back to the intermediate shaft 70.

Referring now to the embodiment of the invention illustrated in Fig. 2, it will be observed that a driving shaft 210 is provided with a rotatable housing 212 having an axially extended cylindrical portion 214 housing a plurality of spaced radially extended stub shafts 216. Each of the stub shafts 216 is provided with beveled planet pinions 218 having radially spaced bevel gears 220 and 222 of different diameters.

An axially extended sleeve 224 associated with the shafts 216 of the planet pinions 218 is mounted on one-way driving means 226 on a hub 228 mounted on a driven shaft 230 axially aligned with the driving shaft 210. The hub 228 is provided with an impeller 232 having suitable impeller blades 234 interposed between an impeller web 236 and an impeller shroud 238.

Rotation of the impeller serves to energize liquid and direct it to spaced rectifying vanes 240 of a turbine member 242. The rectifying vanes 240 are interposed between a turbine web 244 and a turbine shroud 246 and serve to rectify fluid flow from the impeller 232 and direct it to main impeller vanes 248 interposed between the turbine web 244 and shroud 246. The turbine web 244 is secured to a turbine hub 250 fixed to the driven shaft 230.

Each of the pinion gears 220 meshes with a ring bevel gear 254 carried by the hub 228. A ring bevel gear 256 carried by an axially extended sleeve 260 concentrically mounted on the driven shaft 230 and provided with a radially extended flange 262 terminating in a drum 264. This drum 264 is adapted to be engaged by a brake band 266 actuated by a suitable hydraulic unit 268.

The bevel gears 222 mesh with a bevel ring gear 270 carried by spaced flanges 272 and 274 connected by an axial sleeve 276. The flange 274 is provided with a drum 278 adapted to be engaged by a brake band 280 actuated by a suitable hydraulic unit 282.

In the operation of this device it will be noted that when it is desired to transmit power at relatively low speed the hydraulic units 268 and 282 are rendered inoperative. Power applied to the driving shaft 210 rotates the housing 212, cylindrical portion 214 and radially extending stub shafts 216. Rotation of these members is transmitted through the sleeve 224 and one-way driving means 226 to rotate the impeller hub 228 whereupon fluid is energized in the power transmitting fluid circuit by the impeller 232.

Energized fluid leaving the impeller is directed to successively impinge on the rectifying vanes 240 and the main vanes 248 of the turbine member 242 whereupon energy is extracted from the circulating fluid and is transmitted through the turbine hub 250 to drive the driven shaft 230. It will be observed that when the drive is in this direction the impeller of the fluid transmission rotates at substantially the same speed as the driving shaft 210.

When it is desired to transmit power to the driven shaft at greater speed the hydraulic unit 268 is actuated whereupon the brake band 266 engages the drum 264 to lock the bevel ring gear 256 against rotation. When the bevel ring gear 256 is locked against rotation the bevel pinions 220 are rotated on their respective shafts 216 and transmit power through the bevel ring gear 254 to rotate the impeller hub 228 and impeller 232 at increased speed. Due to the increase in speed of rotation of the impeller 232 increased power is transmitted to the turbine 242 and driven shaft 230.

When it is desired to transmit power at still higher speed the hydraulic unit 282 is actuated whereupon the brake band 280 engages the drum 278 to lock the bevel ring gear 270 against rotation. The bevel pinions 222 engaging the bevel ring gear 270 cause the bevel pinions 220 to rotate at higher peripheral speed whereupon the bevel ring gear 254 is rotated at faster speed to rotate the impeller hub 228 and impeller 232 at increased speed thereby energizing the circulating fluid and transmitting greater energy to the turbine 242 to drive the driven shaft 230 at still higher speeds.

I claim:

1. In a power transmitting device, a pair of aligned primary and secondary driving shafts, a driven shaft, speed varying means including epicyclic gear train means between the primary and secondary driving shafts, manually operable means to vary the speed at which the secondary driving shaft is rotated, planetary gearing including a plurality of spaced pinion gears interposed between the secondary driving shaft and the driven shaft, means driven by a plurality of said spaced pinion gears to drive the driven shaft, a regenerative fluid actuated power transmitting mechanism associated with one of said driving shafts and including spaced impeller and turbine members cooperating to form a power transmitting fluid circuit, means driven by a plurality of spaced pinion gears of the planetary gearing to drive the impeller, and one-way driving means between the turbine and one of said driving shafts.

2. A power transmitting device comprising a pair of driving shafts, an epicyclic gear train interposed between said driving shafts, spaced manually operable means controlling the epicyclic gear train to provide a plurality of forward speeds and a reverse speed, a driven shaft, planetary gearing including spaced pinion gears interposed between one of the driving shafts and the driven shaft, a ring gear driven by one portion of said pinion gears and operably connected to the driven shaft, a regenerative power transmitting mechanism comprising aligned impeller and turbine members cooperating to form a power transmitting fluid circuit, a sun gear driven by one portion of said spaced pinion gears operably connected to said impeller, one-way driving means between the turbine and one of the driving shafts, a sun gear engaging a portion of said spaced pinion gears, manually operable means to lock the sun gear against rotation to transmit power to the driven shaft at a varying speed ratio, a ring gear positioned to engage a portion of said spaced pinion gears, and manually operable means to lock said ring gear against rotation to transmit power to the driven shaft in reverse direction.

3. In a power transmitting device, primary and secondary driving shafts, a driven shaft, connecting means including a planetary gear train having a plurality of spaced pinion gears of varying size interposed between the primary and secondary driving shafts, a plurality of gear means engaging the spaced pinion gears, planetary gearing having a plurality of spaced pinion gears interposed between the secondary driving shaft and the driven shaft, a plurality of gear means engaging the last-named spaced pinion gears, manually operable means to selectively lock the first-named gear means against rotation to vary the speed of the secondary driving shaft, and regenerative power transmitting means interposed between the second-named planetary gearing and one of said driving shafts.

4. A power transmitting device comprising a pair of aligned primary and secondary driving shafts, a driven shaft, speed varying means including manually controlled epicyclic gear train means between the primary and secondary driving shafts, manually controlled planetary gearing including a plurality of spaced pinion gear portions interposed between the secondary driving shaft and the driven shaft, means driven by a portion of said spaced pinion gears to drive the driven shaft, a regenerative fluid actuated power transmitting mechanism associated with one of said driving shafts and the driven shaft and including rotatable impeller and turbine members cooperating to form a power transmitting fluid circuit, means driven by a portion of said spaced pinion gears of the planetary gearing to drive the impeller, and one-way driving means between the turbine and one of said driving shafts.

5. In a power transmitting device, a pair of driving shafts, an epicyclic gear train interposed between said driving shafts, spaced manually operable means controlling the epicyclic gear train to provide a plurality of forward speeds and a reverse speed, a driven shaft, planetary gearing including spaced pinion gear portions interposed between one of the driving shafts and the driven shaft, gear means driven by a portion of said pinion gears and operably connected to the driven shaft, a regenerative power transmitting mechanism comprising aligned impeller and turbine members cooperating to form a power transmitting fluid circuit, gear means driven by a portion of said spaced pinion gears operably connected to said impeller, driving means between the turbine and one of said shafts, gear means engaging a portion of said spaced pinion gears, and manually operable means to lock the last named gear means against rotation to transmit power to the driven shaft at a varying speed ratio.

6. In a power transmitting device, a pair of aligned driving and driven shafts, a fluid transmission including rotatable impeller and turbine members concentrically mounted relative to said shafts and cooperating to form a power transmitting fluid circuit, planetary gearing including spaced bevelled pinion gears interposed between the driving shaft and the impeller, bevelled gear means positioned to engage said bevelled pinion gears, manually operable means to lock said bevelled gear means against rotation to vary the speed of rotation of the impeller relative to the driving shaft, and connecting means between the turbine and the driven shaft.

7. A power transmitting device comprising aligned driving and driven shafts, fluid power transmitting means including rotatable impeller and turbine members cooperating to form a power transmitting fluid circuit, connecting means between the driving shaft and the impeller comprising concentrically mounted rotatable members, one-way driving means between said members whereby the impeller may be driven in one direction at 1:1 speed ratio with the driving shaft, planetary gearing having a plurality of spaced pinion gears interposed between the driving shaft and impeller, spaced gear means positioned to engage a plurality of said spaced pinion gears, manually operable means to selectively lock said gear means against rotation to transmit power from the driving shaft to rotate the impeller at varying speeds, and connecting means between the turbine and the driven shaft.

8. A power transmitting device comprising a driving shaft having a rotatable housing, a driven shaft axially aligned with the driving shaft, a shell projecting axially from said housing and concentrically mounted relative to the driven shaft, a plurality of stub shafts carried by said shell, a fluid transmission including rotatable impeller and turbine members positioned in said housing and cooperating to form a power transmitting fluid circuit, one-way driving means between said shell and the impeller, a plurality of spaced pinion gears carried by said stub shafts, gear means positioned to engage a plurality of said pinion gears, manually operable means to selectively lock said gear means against rotation to vary the speed of rotation of the impeller relative to the driving shaft, and connecting means between the turbine and the driven shaft.

9. In a power transmitting device, a driving shaft, a driven shaft aligned with the driving shaft, a rotatable housing carried by and rotatable with the driving shaft, a fluid transmission positioned in the rotatable housing and including rotatable impeller and turbine elements cooperating to form a power transmitting fluid circuit, one-way driving means between the housing and the impeller whereby the impeller may be driven at substantially a 1:1 speed ratio, spaced pinion gears between the housing and the impeller, a gear engaging the pinion gears, manually operable means to lock said last named gears against rotation to rotate the impeller faster than the driving shaft, and driving means between the turbine and the driven shaft.

10. In a power transmitting device comprising driving and driven shafts, fluid power transmitting means including rotatable impeller and turbine members cooperating to form a power transmitting fluid circuit, connecting means between the driving shaft and the impeller comprising concentrically mounted rotatable members, one-way driving means between said members whereby the impeller may be driven in one direction at a 1:1 speed ratio with the driving shaft, planetary gearing having a plurality of spaced bevelled pinion gears interposed between the driving shaft and impeller, a plurality of spaced bevelled gear means positioned to engage a plurality of said spaced bevelled pinion gears, a plurality of manually operable means to selectively lock said bevelled gear means against rotation to vary the speed ratio from the driving shaft to rotate the impeller at varying speeds, and connecting means between the turbine and the driven shaft.

11. In a power transmitting device, a driving shaft, a driven shaft axially aligned with the driving shaft, a shell concentrically mounted relative to the driven shaft, a plurality of radially extending stub shafts carried by said shell, a fluid transmission including rotatable impeller and turbine members cooperating to form a power transmitting fluid circuit, one-way driving means between said shell and the impeller, a plurality of spaced bevelled pinion gears carried by said stub shafts, bevelled gear means positioned to engage a plurality of said bevelled pinion gears, manually operable means to selectively lock said bevelled gear means against rotation to vary the speed of rotation of the impeller relative to the driving shaft, and connecting means between the turbine and the driven shaft.

12. In a power transmitting device, a driving shaft, a driven shaft, a rotatable member driven by and rotatable with the driving shaft, a fluid transmission including rotatable impeller and turbine elements cooperating to form a power transmitting fluid circuit, one-way driving means between the rotatable member and the impeller whereby the impeller may be driven at substantially a 1:1 speed ratio, a plurality of sets of spaced pinion gears between the rotatable member and the impeller, a plurality of gears engaging said pinion gears, a plurality of separate manually operable means to selectively lock said last named gear against rotation to drive the impeller at a plurality of speeds faster than the driving shaft, and driving means between the turbine and the driven shaft.

13. In a power transmitting device, a driving member, a driven shaft, a fluid transmission comprising rotatable impeller and turbine members cooperating to form a power transmitting fluid circuit, speed varying planetary gearing including a plurality of sets of spaced pinion gears of different diameters interposed between the driving member and the impeller, gear means engaging the spaced pinion gears of different diameters, manually operable means to lock said gear means against rotation to vary the speed of the impeller, and one-way driving means between the turbine and the driving member to redirect a portion of the power to the driving member.

14. In a power transmitting device, a driving member, a driven shaft, a fluid transmission including rotatable impeller and turbine members concentrically mounted relative to said shafts and cooperating to form a power transmitting fluid circuit, planetary gearing including spaced sets of pinion gears of different diameters interposed between the driving member and the driven shaft and operably connected to the impeller, gear means positioned to engage said pinion gears of different diameters, manually operable means to lock said gear means against rotation to vary the speed of rotation of the impeller relative to one of said shafts, and one-way driving means between the turbine and the driving member to redirect a portion of the power to the driving member.

JOSEPH JANDASEK.